L. M. HENDLER.
MEANS FOR BLOWING ICE CREAM FROM MOLDS.
APPLICATION FILED JAN. 31, 1917.
1,221,321.
Patented Apr. 3, 1917.
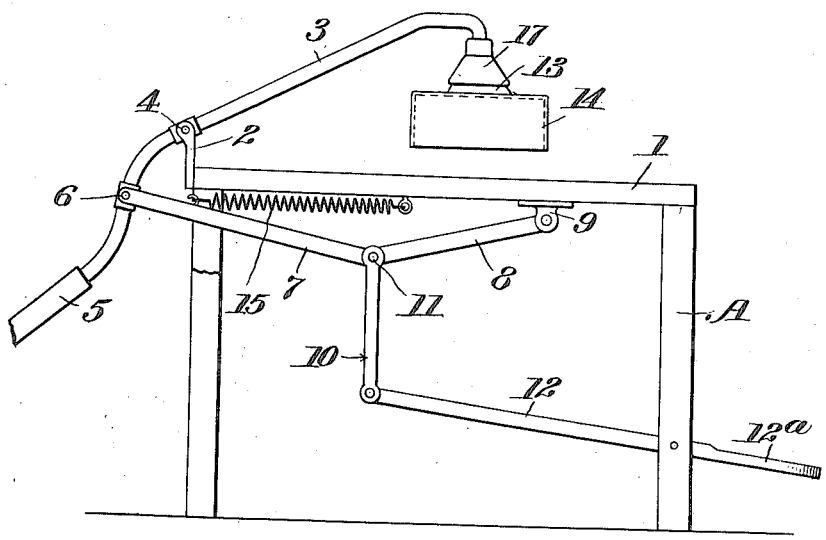
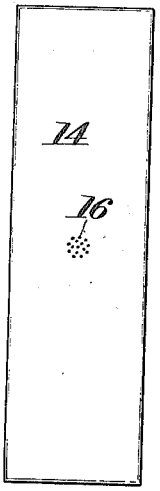
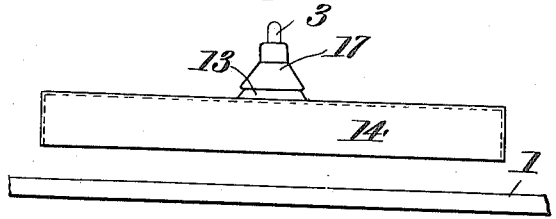
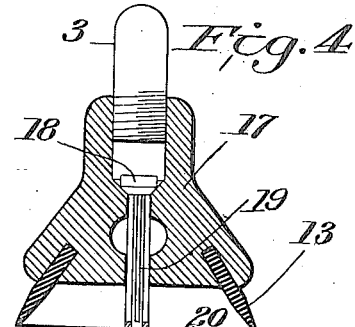
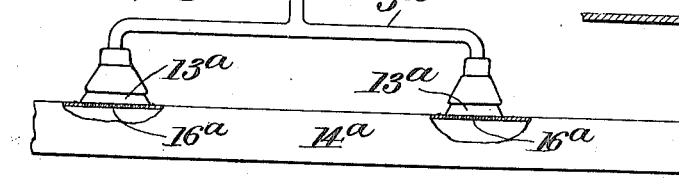
Inventor
L. M. Hendler
By Wilson Bryden
Attorneys

UNITED STATES PATENT OFFICE.

LIONEL MANUEL HENDLER, OF BALTIMORE, MARYLAND.

MEANS FOR BLOWING ICE-CREAM FROM MOLDS.

1,221,321.  Specification of Letters Patent.  Patented Apr. 3, 1917.

Application filed January 31, 1917. Serial No. 145,682.

*To all whom it may concern:*

Be it known that I, LIONEL M. HENDLER, a citizen of the United States, residing at Baltimore, in the State of Maryland, have invented certain new and useful Improvements in Means for Blowing Ice-Cream from Molds, of which the following is a specification.

In the manufacture of ice cream to be sold in the form of bricks, it is customary after the cream has been taken from the freezers to place it in oblong molds, and the molds are then placed in refrigerating rooms where the cream is further frozen and made very hard. Each mold is usually provided with a hole in the bottom, and over this hole is placed a piece of paper, to prevent the cream from passing through when placing the cream in the mold. When it is desired to remove the cream from the mold, it is customary, in many ice cream plants, to dip the mold in warm water long enough to melt the cream where it contacts with the mold, to loosen the cream, then invert the mold over a table, and the operator then places his mouth over the opening in the bottom of the mold and blows into the mold and thereby forces the cream out of the mold. This, of course, is extremely unsanitary.

It is the purpose of the present invention to provide a mold which will not require the insertion of the piece of paper before mentioned, and means for blowing the cream out of the molds in a manner which is more sanitary and more efficient than the old method.

In the accompanying drawing, which illustrates my invention,

Figure 1 is an end view of a table upon which the blowing apparatus is mounted, showing the application of the same to an ice cream mold;

Fig. 2 is a bottom plan view of an ice cream mold having perforations in the bottom instead of the usual opening;

Fig. 3 is a side view of a mold with the nozzle of the blowing apparatus applied thereto, also showing a part of the table;

Fig. 4 is a central section through the valve and bell-mouth of the blowing apparatus; and, Fig. 5 is a side view of a mold having perforations at two points in the bottom and showing two blowing nozzles applied thereto.

Referring to Figs. 1 to 4, of the drawing, A indicates a suitable table, to the bed 1 of which is secured a supporting ear 2, in which an air pipe 3 is pivotally mounted at 4 and adapted to swing in a vertical plane. This pipe, which is of metal, has one end connected to a hose 5, leading from a suitable air pump or reservoir containing compressed air. Pivotally connected to the pipe 4, at the point 6, is a link 7, which link is pivotally connected to a link 8, and the latter is pivotally connected to a support 9, which is secured to the under-side of the table bed 1. A link 10 is connected at 11 to the pivot which joins the links 7 and 8, and the lower end of the link 10 is connected to a foot lever 12. The links 7 and 8 constitute a toggle for rocking the pipe 3, when the foot piece or pedal 12$^a$ of the lever is depressed, to force the bell-mouth 13 on the end of the pipe 3 against the bottom of the ice cream mold 14. A spring 15, connected as shown to the table and to the link 7, rocks the pipe 3 in the opposite direction when the treadle is released.

The mold 14 has a group of rather fine perforations 16, at the center, as shown in Fig. 2. The bell-mouth 13, on the end of the pipe 3, is made preferably of elastic material, such as rubber, and is adapted to fit down on to the bottom of the mold around the group of perforations therein. This bell-mouth as shown is connected by a fitting 17 to the pipe 3, and seated within the fitting is a valve 18, having a downwardly projecting stem 19, to the lower end of which is secured a spider 20. The stem 19 projects slightly below the bell-mouth 13, so that when the bell-mouth is pressed against the bottom of the mold, the spider on the valve stem will engage the mold and cause the valve to open approximately at the time when the bell-mouth is firmly closed against the bottom of the mold. Air entering the bell-mouth, from the pipe 3, at a pressure of about six pounds per square inch, passes through the group of perforations 16, and spreading out over the cream therein, forces the latter from the mold. It will be understood that the mold is held by the operator a slight distance above the bed of the table. As soon as the cream is loosened and the pipe 3 is thrown backward, the mold is raised and the ice cream remains upon the table. The air valve 18 closes automatically when the bell-mouth leaves the mold.

With this apparatus, the unsanitary practice above mentioned is avoided and the cream is removed in a quicker and more satisfactory way. Further, by providing small perforations in the bottom of the mold, instead of a large opening, it is unnecessary to lay a piece of paper over the opening when the cream is first placed in the mold. One advantage of the present method of removing the cream from the molds over the old method described, is that by reason of the quicker and stronger application of air pressure, it is unnecessary to dip the molds for so long a period in hot water, to loosen the cream. When the molds are dipped long enough to soften the cream so that it can be blown out by the breath, the refreezing leaves the cream grainy on the surface. If dipped only for an instant, the cream will freeze to the mold again so that it cannot be blown out by the breath, but it can be blown out by the mechanical process here described, thus leaving the cream smooth on its surface.

The mold, instead of being provided with the single perforations, centrally arranged, as in Fig. 2, may have two groups 16ª, as shown in Fig. 5, in which event the pipe 3 will be provided with a T 3ª and two bell-mouths 13ª, each adapted to fit over a group of perforations, and, of course, the check valves, as in Fig. 4, will be arranged in the ends of the T.

The molds each contain several quarts of ice cream which when removed from the mold, in the form of an oblong block, are cut up into bricks of suitable size.

What I claim is:

1. The combination with an ice cream mold having a perforation in the bottom thereof, of a mechanism for blowing ice cream from the mold comprising a pipe for conveying air under pressure, a valve at the outlet of said pipe and having a stem projecting beyond the pipe, and a resilient bell-mouth surrounding the outlet of said pipe and projecting to approximately the end of the valve stem, said bell mouth adapted to engage the bottom of the mold and surround the perforation therein, and said stem adapted to engage the mold and open the valve.

2. The combination with an ice cream mold having a perforation in the bottom thereof, of a mechanism for blowing ice cream from the mold comprising a pipe for conveying air under pressure, a valve at the outlet of said pipe and having a stem projecting beyond the pipe, a resilient bell-mouth surrounding the outlet of said pipe and projecting to approximately the end of the valve stem, a treadle, and means operated thereby for pressing the bell-mouth against the bottom of the mold, said bell mouth adapted to surround the perforation in the bottom of the mold and said stem adapted to engage the mold and open the valve.

In testimony whereof I have affixed my signature.

LIONEL MANUEL HENDLER.

Witness:
C. ROLLINS ROGERS.